(12) United States Patent
Alkan et al.

(10) Patent No.: US 10,616,527 B2
(45) Date of Patent: Apr. 7, 2020

(54) CABLE TELEVISION ENTRY ADAPTER

(71) Applicant: PPC BROADBAND, INC., East Syracuse, NY (US)

(72) Inventors: Erdogan Alkan, Manlius, NY (US); André Martineau, Manlius, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/028,654

(22) Filed: Jul. 6, 2018

(65) Prior Publication Data

US 2019/0014286 A1    Jan. 10, 2019

Related U.S. Application Data

(60) Provisional application No. 62/529,009, filed on Jul. 6, 2017.

(51) Int. Cl.
| | |
|---|---|
| *H04N 7/10* | (2006.01) |
| *H04N 21/61* | (2011.01) |
| *H04N 21/222* | (2011.01) |
| *H04N 7/173* | (2011.01) |
| *H04N 21/436* | (2011.01) |

(52) U.S. Cl.
CPC ............. *H04N 7/104* (2013.01); *H04N 7/106* (2013.01); *H04N 7/17309* (2013.01); *H04N 21/2221* (2013.01); *H04N 21/43615* (2013.01); *H04N 21/6118* (2013.01); *H04N 21/6168* (2013.01)

(58) Field of Classification Search
CPC ............. H04N 7/104; H04N 21/43615; H04N 21/6168; H04N 7/17309; H04N 7/106; H04N 21/2221; H04N 21/6118
See application file for complete search history.

(56) References Cited

U.S. PATENT DOCUMENTS

| | | | |
|---|---|---|---|
| 2010/0095344 A1 | 4/2010 | Newby et al. | |
| 2011/0072472 A1 | 3/2011 | Wells et al. | |
| 2012/0159556 A1 | 6/2012 | Alkan | |
| 2013/0081096 A1 | 3/2013 | Wells et al. | |
| 2013/0227632 A1 | 8/2013 | Wells et al. | |
| 2018/0205910 A1* | 7/2018 | Li | H04N 7/104 |
| 2018/0288491 A1* | 10/2018 | Shapson | H04N 21/6168 |

OTHER PUBLICATIONS

Blaine R. Copenheaver (Authorized Officer), International Search Report and Written Opinion dated Sep. 28, 2018, PCT Application No. PCT/US2018/041006, filed Jul. 6, 2018, pp. 1-12.

* cited by examiner

*Primary Examiner* — Benjamin R Bruckart
*Assistant Examiner* — Aklil M Tesfaye
(74) *Attorney, Agent, or Firm* — MH2 Technology Law Group LLP

(57) ABSTRACT

A cable television (CATV) entry adapter includes an input port configured to connect to a CATV network, a first output port, a second output port, a first splitter connected to the first output port, and a second splitter connected to the second output port. The first splitter and the second splitter are configured to connect to subscriber devices at a subscriber premises. The entry adapter is configured to transmit signals in a multimedia over coax alliance (MoCA) bandwidth but not signals in a CATV bandwidth to the subscriber devices that are configured to be connected to the first splitter. The entry adapter is configured to transmit the signals in the MoCA bandwidth and the signals in the CATV bandwidth to the subscriber devices that are configured to be connected to the second splitter.

19 Claims, 4 Drawing Sheets

CABLE TELEVISION ENTRY ADAPTER

CROSS-REFERENCE TO RELATED APPLICATIONS

This application claims priority to U.S. Provisional Patent Application No. 62/529,009, filed on Jul. 6, 2017, the entirety of which is incorporated by reference.

FIELD OF THE INVENTION

This invention relates to cable television (CATV) and to in-home entertainment networks that share existing coaxial cables within the premises for CATV signal distribution and in-home network communication signals. More particularly, the present invention relates to a new and improved passive entry adapter between a CATV network and the in-home network that distributes the CATV signal among multiple subscriber or multimedia devices within the subscriber's premises or home.

BACKGROUND

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (e.g., homes and offices) of subscribers to the CATV services. The downstream signals transfer multimedia content to subscriber equipment, such as television sets, telephone sets, and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VoIP) telephone sets use the CATV infrastructure and the public Internet as the communication medium for transmitting two-way telephone conversations.

To permit simultaneous communication of upstream and downstream CATV signals and the interoperability of the subscriber equipment and the equipment associated with the CATV network infrastructure outside of subscriber premises, the downstream and upstream CATV signals are confined to two different frequency bands. The downstream frequency band is within the range of 54-1002 megahertz (MHz), and the upstream frequency band is within the range of 5-42 MHz, in most CATV networks. The entire CATV frequency band is therefore 5-1002 MHz.

The downstream signals are delivered from the CATV network infrastructure to the subscriber premises at a CATV entry adapter, which is also commonly referred to as an entry device, terminal adapter, or a drop amplifier. The CATV entry adapter is usually a multi-port device that provides a multiplicity of ports or connectors for connecting coaxial cables. A separate coaxial cable is connected to each of the ports and extends within the subscriber premises to the location of the subscriber equipment. Some homes have coaxial cables extending to cable outlets in almost every room, because of the many different types of subscriber equipment used in different rooms. For example, television sets are commonplace throughout the home. The multiple ports of the CATV entry adapter deliver downstream CATV signals at each cable outlet and conduct upstream CATV signals back through the premises coaxial cables to the CATV entry adapter, which delivers the upstream CATV signals to the CATV network.

In addition to television sets, computers, and telephones, a relatively large number of other entertainment and multimedia devices are available for use in homes. For example, a digital video recorder (DVR) is used to store broadcast programming, still photography and moving pictures in a memory medium so that the content can be replayed on a display or television set at a later time selected by the user. As another example, computer games are also played at displays or on television sets. Such computer games may be obtained or played over the Internet from the CATV network or from media played on play-back devices or game consoles connected to displays or television sets. As a further example, receivers which receive satellite-broadcast signals may be distributed for viewing or listening throughout the home. These types of devices, including the more-conventional television sets, telephone sets, and devices connected to the Internet by the CATV network, are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. The MoCA in-home network uses the subscriber premise or in-home coaxial cable infrastructure originally established for distribution of CATV signals within the subscriber premises, principally because that cable infrastructure already exists in most homes and is capable of carrying much more information than is carried in the CATV frequency band. A MoCA network is established by connecting MoCA interface devices at the cable outlets in the rooms of the subscriber premises. The MoCA network is used to transmit multimedia content from one MoCA interface device to another.

The MoCA interface devices implement a MoCA communication protocol that encapsulates the multimedia content normally sent and received by the multimedia devices within MoCA packets and then communicates these MoCA packets between selected ones of the other MoCA interfaces devices connected at other cable outlets. The receiving MoCA interface device removes the encapsulated multimedia content, and delivers it to the connected computer, digital television or set-top box, or other multimedia device that then presents the multimedia content.

Each MoCA interface device is capable of communicating with every other MoCA interface device in the MoCA network to deliver the multimedia content throughout the home or subscriber premises. The entertainment or multimedia content that is available from one multimedia device can be displayed, played, or otherwise used at a different location within the home, without having to physically relocate the multimedia device from one location to another within the home. The in-home network communication of multimedia content is considered beneficial in more fully utilizing the multimedia devices present in modern homes. The MoCA+CATV interface devices also pass the upstream and downstream CATV signals between the CATV entry adapter and the subscriber devices.

Since the MoCA network may function simultaneously with the normal operation of the CATV services, the MoCA signals communicated between MoCA interface devices utilize a frequency range of 1125-1675 MHz, which is outside of the frequency band of CATV signals. This so-called D band of MoCA signals is divided into eight different frequency ranges, D1-D10, and these ten different D frequency ranges are used to assure communication between the selected MoCA interface devices. For example, the D1 band at 1125-1175 MHz may be used to communicate CATV television programming content between a MoCA interface device connected to a set-top box in a main room of the house and another MoCA interface device connected to a television set in bedroom of the house, while a MoCA interface device connected to a computer gaming multimedia device in a basement room of the house simultaneously communicates computer game content over the D6 band at 1375-1425 MHz to a computer located in a recreation room of the house. The MoCA frequency band also includes other frequency ranges outside of the CATV frequency band, but the D band is used to establish connections and communicate content between the MoCA interface devices.

If the high-frequency MoCA signals aren't blocked at the entry box, they may transmit information from the subscriber's premises or home to the headend that the subscriber does not wish to share. A PoE filter is often used to prevent (e.g., filter) the MoCA signals from being leaked outside the subscriber's premises or home and to reflect signals from port to port to ease the MoCA signal communication.

In conventional entry adapters, the PoE filter is positioned within the entry adapter, and all ports are required to allow MoCA and CATV transmission together. When more than five output ports are required from an entry device, the PoE filter alone cannot achieve the performance required. As a result, one or more diplexers may be used to implement a good MoCA path. Adding diplexers makes the design of the entry adapter very complicated, and repeatability of performance suffers from unit to unit. This often results in costly designs and the manufacturing of user-unfriendly products. The main reason to have all output ports meet the MoCA and CATV communication together is to prevent installation errors in the field. In the general installation practice, gateways and modems are set to transmit and receive CATV and MoCA signals. The other MoCA devices connected to the remainder of the output ports are set to communicate in the MoCA band only. Thus, having all ports meet MOCA and CATV specifications is not needed.

Because all output ports of an entry device need to have MoCA and CATV communication compatibility, the PoE and/or diplexers have to be integrated and tuned in the design to meet the required specifications. In the event that the CATV frequency band and/or the MoCA frequency band change in the future, the entire entry adapter may need to be replaced with a newer version that is compatible with the new frequency bands. What is needed is an improved entry adapter between the CATV network and the in-home network that distributes the CATV signal among multiple subscriber or multimedia devices within the subscriber's premises or home.

SUMMARY

A cable television (CATV) entry adapter is disclosed. The CATV entry adapter includes a first housing and a second housing. The first housing includes an input port configured to connect to a CATV network, a low-pass filter connected to the input port, a first output port, a high-pass filter connected to the first output port, a second output port. The second housing includes a first splitter connected to the first output port and a second splitter connected to the second output port. The first splitter and the second splitter are configured to connect to subscriber devices at a subscriber premises. The entry adapter is configured to transmit in-home network signals in an in-home network from a first of the subscriber devices that is configured to be connected to the first splitter to a second of the subscriber devices that is configured to be connected to the first splitter. The entry adapter is configured to transmit the in-home network signals in the in-home network from the first of the subscriber devices that is configured to be connected to the first splitter to a third of the subscriber devices that is configured to be connected to the second splitter. The entry adapter is configured to prevent the first of the subscriber devices that is configured to be connected to the first splitter from receiving downstream CATV signals. The entry adapter is configured to the transmit the in-home network signals in the in-home network from the third of the subscriber devices that is configured to be connected to the second splitter to the first of the subscriber devices that is configured to be connected to the first splitter. The entry adapter is configured to transmit the in-home network signals in the in-home network from the third of the subscriber devices that is configured to be connected to the second splitter to a fourth of the subscriber devices that is configured to be connected to the second splitter. The entry adapter is configured to allow the third of the subscriber devices that is configured to be connected to the second splitter to receive the downstream CATV signals.

In another embodiment, the CATV entry adapter includes an input port configured to connect to a CATV network, a first output port, a second output port, a first splitter connected to the first output port, and a second splitter connected to the second output port. The first splitter and the second splitter are configured to connect to subscriber devices at a subscriber premises. The entry adapter is configured to transmit signals in a multimedia over coax alliance (MoCA) bandwidth but not signals in a CATV bandwidth to the subscriber devices that are configured to be connected to the first splitter. The entry adapter is configured to transmit the signals in the MoCA bandwidth and the signals in the CATV bandwidth to the subscriber devices that are configured to be connected to the second splitter.

In yet another embodiment, the CATV entry adapter includes a first housing and a second housing. The first housing includes an input port configured to connect to a CATV network, a low-pass filter connected to the input port, a first output port, a high-pass filter connected to the first output port, and a second output port. The second housing is positioned outside the first housing and includes a first splitter connected to the first output port and a second splitter connected to the second output port. The first splitter and the second splitter are configured to connect to subscriber devices at a subscriber premises. The entry adapter is configured to transmit in-home network signals in an in-home network from a first of the subscriber devices that is configured to be connected to the first splitter to a second of the subscriber devices that is configured to be connected to the first splitter. The entry adapter is configured to transmit the in-home network signals in the in-home network from the first of the subscriber devices that is configured to be connected to the first splitter to a third of the subscriber devices that is configured to be connected to the second splitter. The entry adapter is configured to prevent the first of the subscriber devices that is configured to be connected to the first splitter from receiving downstream CATV signals.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Figure 1:
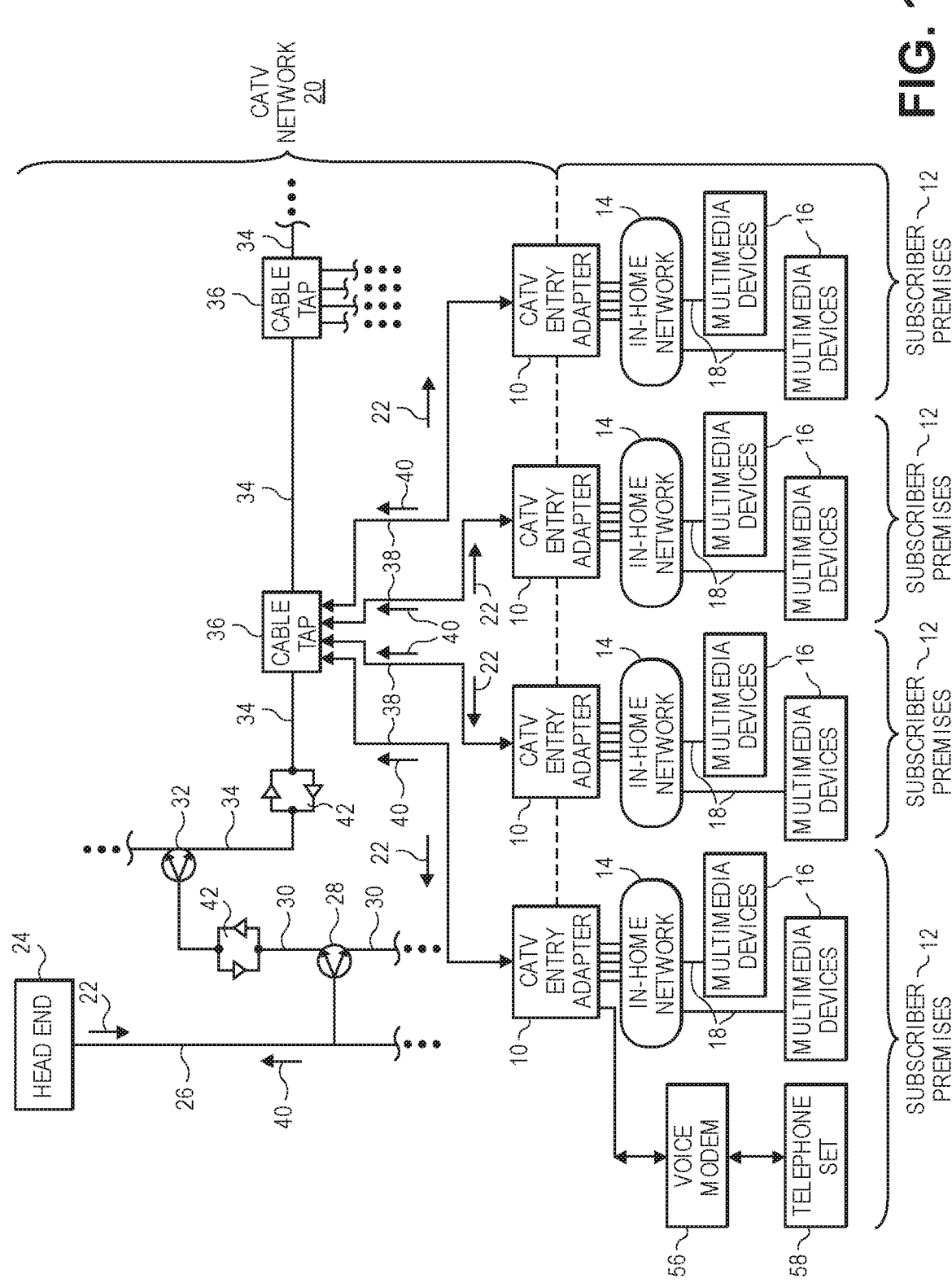
FIG. 1 is a block diagram illustrating a CATV network infrastructure, including a plurality of entry adapters and an in-home network using an entry adapter for connecting multimedia devices or other subscriber equipment within the subscriber premises.

A CATV entry adapter 10 is shown generally in FIG. 1. The CATV entry adapter 10 is located at subscriber premises 12 and forms a part of a conventional in-home network 14, such as a conventional Multimedia over Coax Alliance (MoCA) in-home entertainment network. The in-home network 14 interconnects subscriber equipment or multimedia devices 16 within the subscriber premises 12, and allows the multimedia devices 16 to communicate multimedia content or in-home signals between other multimedia devices 16. The connection medium of the in-home network 14 is formed in significant part by a preexisting CATV coaxial cable infrastructure (represented generally by coaxial cables 18) present in the subscriber premises 12 and originally intended to communicate CATV signals between the multimedia or subscriber devices 16. However, the connection medium of the in-home network 14 may be intentionally created using newly-installed coaxial cables 18. Examples of multimedia devices 16 are digital video recorders, computers, data modems, computer game playing devices, television sets, television set-top boxes, and other audio and visual entertainment devices.

The entry adapter 10 is also a part of a CATV network 20. The entry adapter 10 delivers CATV multimedia content or signals from the CATV network 20 to subscriber equipment at the subscriber premises 12. The subscriber equipment includes the multimedia devices 16, but may also include other devices which may or may not operate as a part of the in-home network 14 but which are intended to function as a result of connection to the CATV network 20. Examples of subscriber equipment which may not be part of the in-home network 14 are a modem 56 and a connected voice over Internet protocol (VoIP) telephone set 58 and certain other embedded multimedia terminal adapter-(eMTA) compatible devices (not shown).

The entry adapter 10 has characteristics that allow it to function simultaneously in both the in-home network 14 and in the CATV network 20, thereby benefiting both the in-home network 14 and the CATV network 20. The entry adapter 10 functions as a hub in the in-home network 14, to effectively transfer in-home network signals between the multimedia and subscriber devices 16. The entry adapter 10 also functions as an interface between the CATV network 20 and the subscriber equipment 16 located at the subscriber premises 12, thereby providing CATV service to the subscriber. In addition, the entry adapter 10 securely confines in-home network communications within each subscriber premises and prevents the network signals from entering the CATV network 20 and degrading the strength of the CATV signals conducted by the CATV network 20 for possible recognition by a nearby subscriber.

The CATV network 20 has a typical topology. Downstream signals 22 originate from programming sources at a headend 24 of the CATV network 20, and are conducted to the entry adapter 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 originating from the subscriber equipment 16, 56, 58 are delivered from the entry adapter 10 to the CATV network 20, and are conducted to the headend 24 in the same path but in reverse sequence. Interspersed at appropriate locations within the topology of the CATV network 20 are repeater amplifiers 42, which amplify both the downstream CATV signals 22 and the upstream signals 40. Repeater amplifiers may also be included in the cable taps 36. The cable taps 36 and signal splitter/combiners 28, 32 divide a single downstream signal into multiple separate downstream signals, and combine multiple upstream signals into a single upstream signal.

Figure 2:
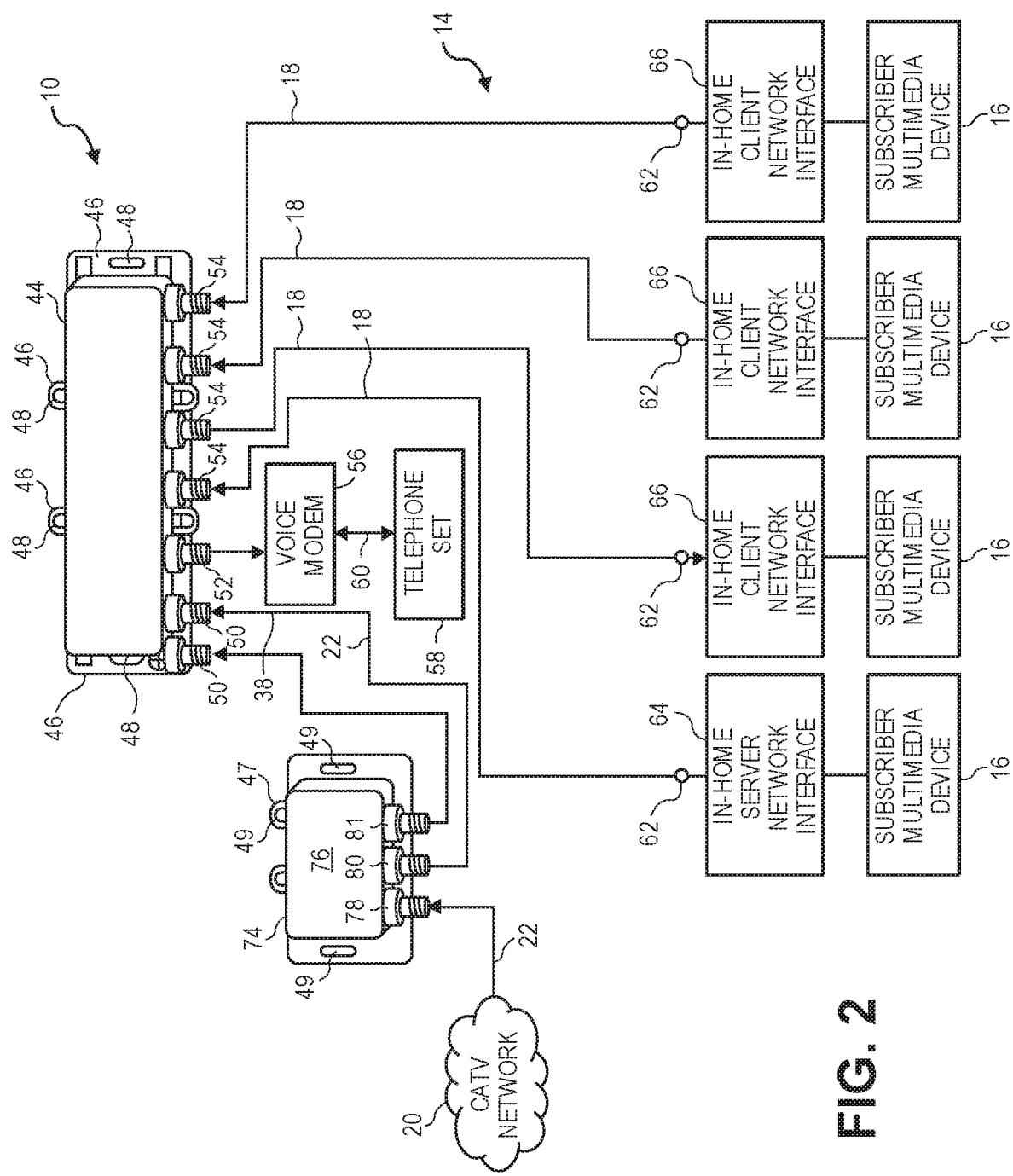
FIG. 2 is a more detailed illustration of the in-home network in one subscriber premises shown in FIG. 1, with more details of network interfaces and subscriber equipment shown in block diagram form.

More details concerning the entry adapter 10 are shown in FIG. 2. The entry adapter 10 may include a first housing 74 and a second housing 44. The first housing 74 may include a mounting flange 47 and holes 49 in the flange 47 that allow attachment of the first housing 74 to a support structure at a subscriber premises 12 (FIG. 1). Similarly, the second housing 44 may include a mounting flange 46 and holes 48 in the flange 46 that allow attachment of the second housing 44 to a support structure at a subscriber premises 12 (FIG. 1). The first housing 74 may be coupled (e.g., fastened) to the second housing 44, or may be separated therefrom. In at least one embodiment, the first housing 74 is not positioned within the second housing 44.

The first housing 74 may have a diplexer 76 positioned therein. An input port 78 of the diplexer 76 may be connected to the CATV network 20 (see FIG. 1). One or more output ports (two are shown: 80, 81) of the diplexer 76 may be connected to one or more connection ports (two are shown: 50) of the second housing 44. The downstream signals 22 from the CATV network 20 may be introduced into the input port 78 of the diplexer 76. The downstream signals 22 may then be transmitted from one or more of the output port(s) 80, 81 of the diplexer 76 into the connection port(s) 50 of the second housing 44. The upstream signals 40 may be transmitted from the connection port(s) 50 of the second housing 44, to the one or more of the output port(s) (e.g., port 81, as described below) of the diplexer 76.

Referring now to the second housing 44 in greater detail, the downstream signals 22 and upstream signals 40 are communicated to and from the subscriber equipment through an embedded multimedia terminal adapter (eMTA) port 52 and through in-home network ports 54. A modem 56 is connected between a voice over Internet protocol (VoIP) telephone set 58 and the eMTA port 52. The modem 56 converts downstream CATV signals 22 containing data for the telephone set 58 into signals 60 usable by the telephone set 58 in accordance with the VoIP protocol. Similarly, the modem 56 converts the VoIP protocol signals 60 from the telephone set 58 into upstream signals 40 that are sent through the eMTA port 52 and the CATV entry port 50 to the CATV network 20.

Coaxial cables 18 within the subscriber premises 12 (FIG. 1) connect the in-home network ports 54 to coaxial outlets 62. The in-home network 14 uses a new or existing coaxial cable infrastructure in the subscriber premises 12 (FIG. 1) to locate the coaxial outlets 62 in different rooms or locations within the subscriber premises 12 (FIG. 1) and to establish the communication medium for the in-home network 14.

In-home network interface devices 64 and 66 are connected to or made a part of the coaxial outlets 62. The devices 64 and 66 send in-home network signals 108 between one another through the coaxial outlets 62, coaxial cables 18, the network ports 54, and the CATV entry adapter 10. The CATV entry adapter 10 internally connects the network ports 54 to transfer the network signals 108 between the ports 54.

Subscriber or multimedia devices 16 are connected to the in-home network interfaces 64 and 66. In-home network signals originating from a subscriber device 16 connected to one of the network interfaces 64 or 66 are delivered through the in-home network 14 to the interface 64 or 66 of the recipient subscriber device 16. The network interfaces 64 and 66 perform the functions of buffering information, typically in digital form as packets, and delivering and receiving the packets over the in-home network 14 in accordance with the communication protocol used by the in-home network, for example the MoCA protocol. Although the information is typically in digital form, communication over the in-home network 14 may be as analog signals in predetermined frequency bands, such as the Dband frequencies used in the MoCA communication protocol. The combination of one of the in-home network interfaces 64 or 66 and the connected subscriber device 16 constitutes one node of the in-home network 14.

The systems and methods disclosed herein take advantage of typical server-client technology and incorporate it within the in-home network interfaces 64 and 66. The in-home network interface 64 is a server network interface, while the in-home network interfaces 66 are client network interfaces. Only one server network interface 64 is present in the in-home network 14, while multiple client network interfaces 66 are typically present in the in-home network 14.

The server network interface 64 receives downstream CATV signals 22 and in-home network signals originating from other client network interfaces 66 connected to subscriber devices 16, extracts the information content carried by the downstream CATV signals 22 and the network signals, and stores the information content in digital form on a memory device (not shown) included within the server network interface 64. With respect to downstream CATV signals 22, the server network interface 64 communicates the extracted and stored information to the subscriber device 16 to which that information is destined. Thus, the server interface 64 delivers the information derived from the downstream CATV signal 22 to the subscriber device connected to it, or over the in-home network 14 to the client interface 66 connected to the subscriber device 16 to which the downstream CATV signal 22 is destined. The recipient client network interface 66 extracts the information and delivers it to the destined subscriber device connected to that client network interface 66. For network signals originating in one network interface 64 or 66 and destined to another network interface 64 or 66, those signals are sent directly between the originating and recipient network interfaces 64 or 66, utilizing the communication protocol of the in-home network.

For example a programming content selection signal originating from a set-top box of a television set, the upstream signal may be communicated into the CATV network 20 by the in-home server network interface 64, or is alternatively communicated by the network interface 64 or 66 which is connected to the particular subscriber device 16. In some implementations, if the upstream signal originates from a subscriber device 16 connected to a client network interface 66, that client network interface 66 encodes the upstream signal, and sends the encoded signal over the in-home network 14 to the server network interface 64; thereafter, the server network interface 64 communicates the upstream signal through the entry adapter 10 to the CATV network 20. If the upstream signal originates from the subscriber device connected to the server network interface 64, that interface 64 directly communicates the upstream signal through the entry adapter 10 to the CATV network 20.

Using the server network interface 64 to receive the multimedia content from the downstream signals 22 and then distribute that content in network signals to the client network interfaces 66 for use by the destination subscriber devices 16, may reduce or prevent a substantial degradation in the signal strength of the downstream CATV signal, as would be the case if the downstream CATV signal was split into multiple reduced-power copies and each copy delivered to each subscriber device 16. By splitting downstream signals 22 only a few times, as compared to a relatively large number of times as would be required in a typical in-home network, good CATV signal strength is achieved at the server network interface 64. Multimedia content or other information in downstream signals 22 that are destined for subscriber devices 16 connected to client network interfaces 66 is supplied by the server network interface 64 in network signals that have sufficient strength to ensure good quality of service. Upstream signals 40 generated by the server directly and client interfaces 64 and 66 indirectly are of adequate signal strength since the originating interfaces are capable of delivering signals of adequate signal strength for transmission to the CATV network 20.

Figure 3:
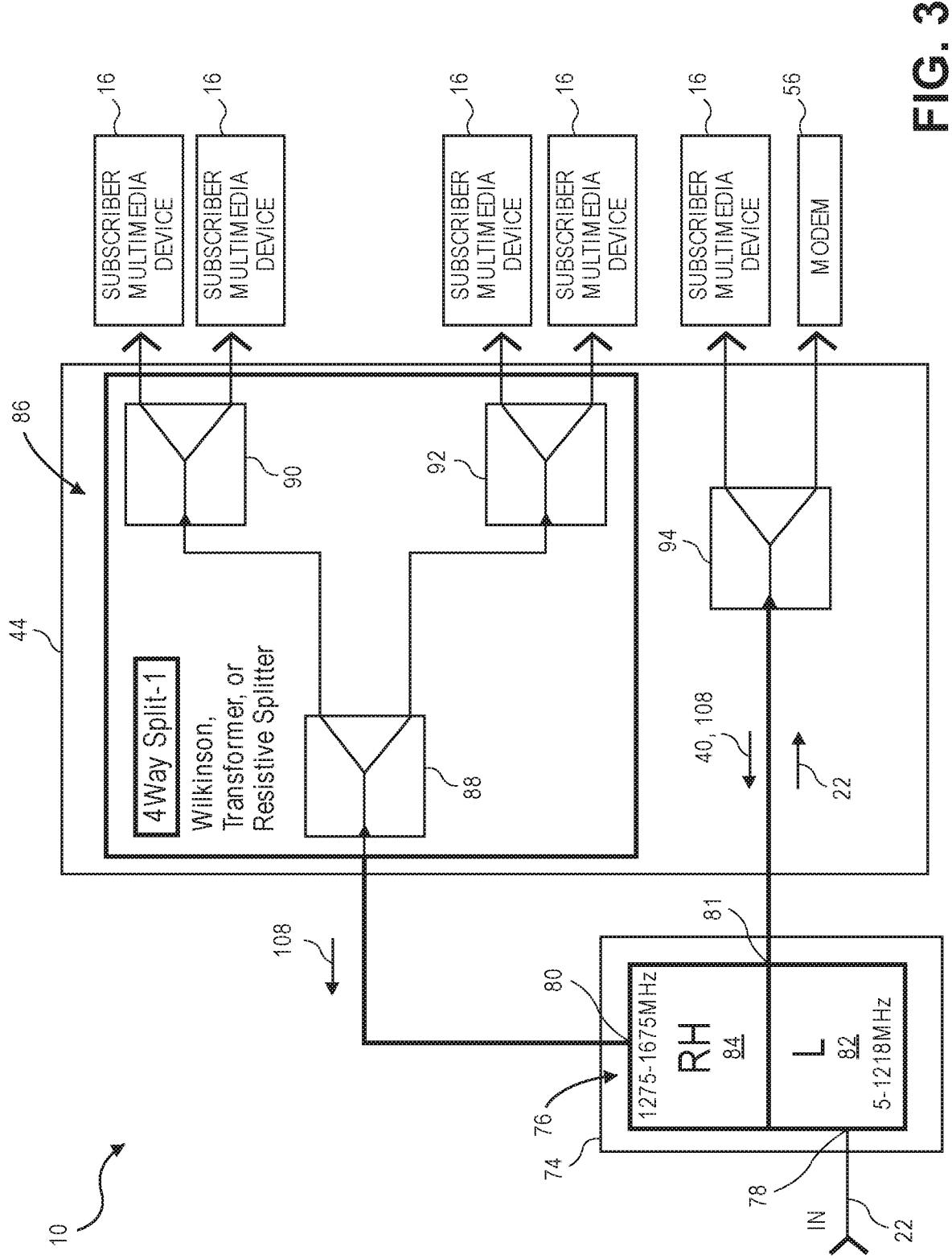
FIG. 3 is a block diagram illustrating an embodiment of an entry adapter.

FIG. 3 is a block diagram illustrating an example embodiment of the entry adapter 10. The diplexer 76 may include a low-pass filter 82 connected to the input port 78 of the diplexer 76. The low-pass filter 82 may allow signals in a first low frequency band to pass therethrough but prevent signals outside this band to pass therethrough. The first low frequency band may be from 5 MHz to 1002 MHz, from 5 MHz to 1194 MHz, from 5 MHz to 1218 MHz, from 5 MHz to 1275 MHz, or any other range. The diplexer 76 may also include a high-pass filter 84 connected to the first output port 80 of the diplexer 76. The high-pass filter 84 may allow signals in a high frequency (i.e., MoCA) band to pass therethrough but prevent signals outside this band to pass therethrough. The high frequency (i.e., MoCA) band may be from 1125 MHz to 1675 MHz, from 1275 MHz to 1675 MHz, or any other range above the first low frequency band.

As shown, the downstream signals 22 (e.g., from the CATV network 20) may be introduced into the input port 78 of the diplexer 76. The downstream signals 22 may be CATV signals in a second low frequency band. The second low frequency band may be from 5 MHz to 1002 MHz, from 5 MHz to 1194 MHz, from 5 MHz to 1218 MHz, from 5 MHz to 1275 MHz, or any other range. For example, the first and second low frequency bands may be the same at the lower end, the upper end, or both ends. Thus, the downstream signals 22 may enter the input port 78 and pass through the low-pass filter 82. The downstream signals 22 may be prevented from exiting the first output port 80 by the high-pass filter 84. Thus, the first output port 80, in some embodiments, may be a MOCA-only port (i.e., no CATV signals pass therethrough in the downstream and/or upstream direction). The downstream signals 22 may, however, exit a second output port 81 of the diplexer 76, which is not connected to the high-pass filter 84.

The first output port 80 of the diplexer 76 may be connected to a four-way splitter 86. The four-way splitter 86 may include one or more splitters (three are shown: 88, 90, 92). The splitters 88, 90, 92 may be or include Wilkinson splitters, transformer splitters, or resistive splitters. As shown, the first output port 80 of the diplexer 76 may be connected to an input port of the first splitter 88. A first output port of the first splitter 88 may be connected to an input port of the second splitter 90. A second output port of the first splitter 88 may be connected to an input port of the third splitter 92. The second and third splitters 90, 92 may each have two output ports that may be connected to multimedia devices 16 (e.g., MoCA access points or MoCA set-top boxes). In other embodiments, the output ports may be connected to modems 56 or telephone sets 58. The output ports of the second and third splitters 90, 92 may be MOCA-only ports (i.e., no CATV signals pass therethrough in the downstream and/or upstream direction).

The second output port 81 of the diplexer 76 may be connected to an input port of a fourth splitter 94. A first output port of the fourth splitter 94 may be connected to a multimedia device 16 (e.g., a Gateway MoCA). A second output port of the fourth splitter 94 may be connected to a modem 56. One or more (e.g., all) of the splitters 88, 90, 92, 94 may be positioned within the second housing 44. As shown, in this embodiment, the entry adapter 10 is a modular, two-piece unit that has the diplexer 76 in a separate housing 74 from the splitters 88, 90, 92, 94. This embodiment is cost-friendly to adapt to an infrastructure change (e.g., 5-1002 MHz to 5-1218 MHz). In another embodiment, the entry adapter 10 may be a single unit (i.e., with the diplexer 76 and splitters 88, 90, 92, 94 in a common housing).

The MoCA signals 108 (e.g., from the multimedia devices 16) entering the four-way splitter 86 may be transmitted to any of the other multimedia devices 16 connected to the four-way splitter 86. For example, the MoCA signals 108 from one of the multimedia devices 16 connected to the second splitter 90 may be transmitted to the other multimedia device 16 connected to the second splitter 90 or either/both of the multimedia devices 16 connected to the third splitter 92.

The MoCA signals 108 (e.g., from the multimedia devices 16) entering the first output port 80 of the diplexer 76 may be in the high frequency (i.e., MoCA) band. The MoCA signals 108 in the high frequency band may be allowed to pass through the high-pass filter 84 to the second output port 81, where the signals may then be transmitted to the multimedia devices 16 or modems 56 connected to the fourth splitter 94. The MoCA signals 108 in the high frequency band may be prevented from passing through the low-pass filter 82 to the input port 78. Thus, the MoCA signals 108 in the high frequency band may be prevented from being transmitted to the CATV network 20 where they may be seen as noise.

The MoCA signals 108 (e.g., from the multimedia devices 16) entering the second output port 81 may be in the high frequency (i.e., MoCA) band. The upstream signals 40 in the second low frequency band (e.g., CATV signals) may pass through the low-pass filter 82 and exit through the input port 78 of the diplexer 76, after which the upstream signals 40 may be transmitted to the CATV network 20. The upstream signals 40 in the second low frequency band may be prevented from passing through the high-pass filter 84 to the first output port 80. The MoCA signals 108 in the high frequency band may be prevented from passing through the low-pass filter 82 to the input port 78. Thus, the MoCA signals 108 in the high frequency (i.e., MoCA) band may be prevented from being transmitted to the CATV network 20 where they may be seen as noise. The MoCA signals 108 in the high frequency band may be allowed to pass through the high-pass filter 84 to the second output port 81, where the signals may then be transmitted to the multimedia devices 16 or modems 56 connected to the four-way splitter 86. In at least one embodiment, the multimedia devices 16 connected to the four-way splitter 86 may be or include MoCA-only devices, and the multimedia devices 16 connected to the fourth splitter 94 may be both MoCA and CATV devices.

Figure 4:
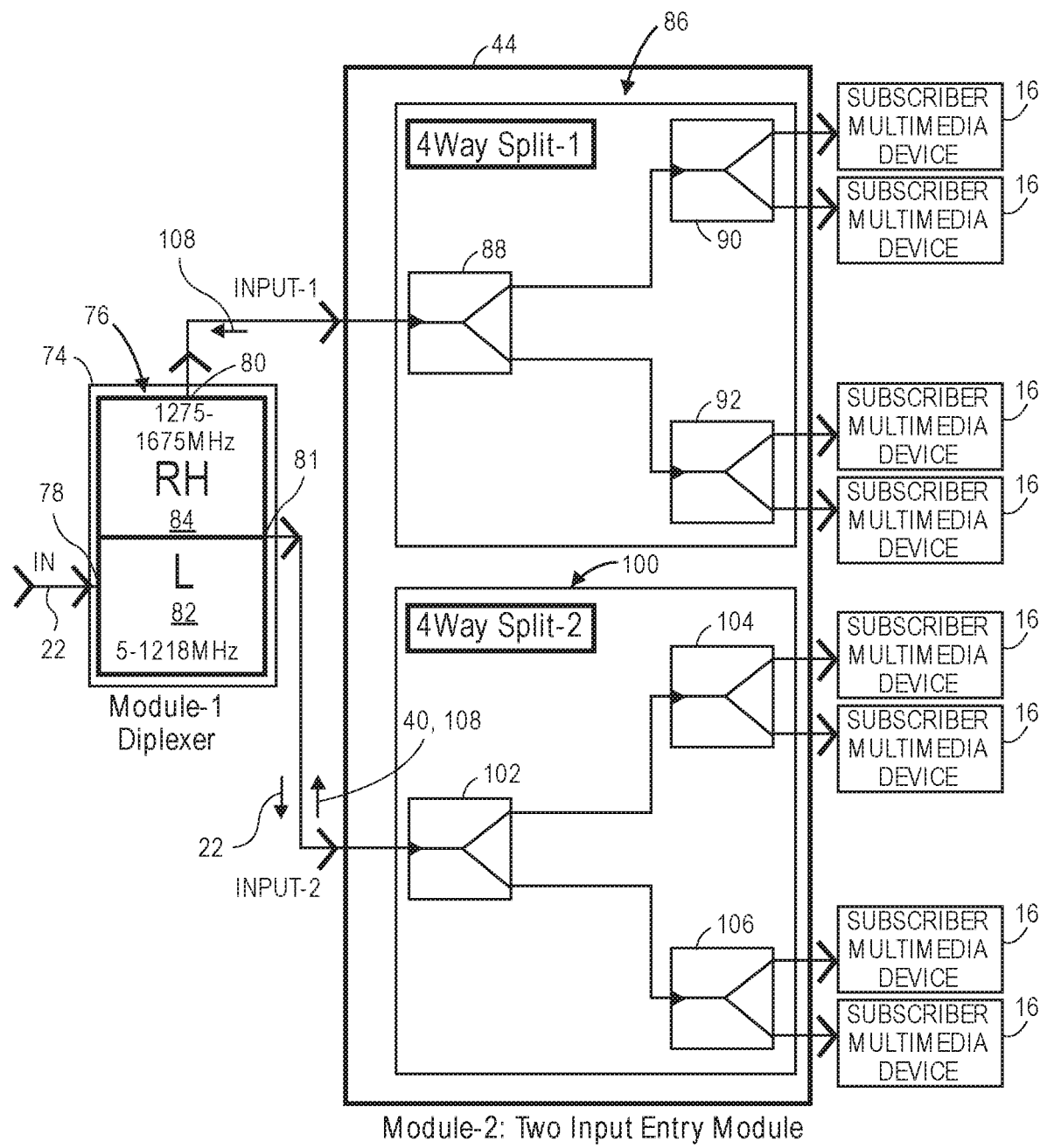
FIG. 4 is another block diagram illustrating another embodiment of the entry adapter.

FIG. 4 is a block diagram illustrating another embodiment of the entry adapter 10. The entry adapter 10 of FIG. 4 differs from the entry adapter 10 of FIG. 3 in that the fourth splitter 94 has been replaced with a second four-way splitter 100. The MoCA signals 108 entering the second four-way splitter 100 may be transmitted to any of the other multimedia devices 16 (or modems 56 or telephone sets 58) connected to the second four-way splitter 100.

The upstream signals 40 and MoCA signals 108 from the second four-way splitter that enter the second output port 81 of the diplexer 76 may be in the second low frequency band or in the high frequency (i.e., MoCA) band. The upstream signals 40 in the second low frequency band may pass through the low-pass filter 82 and exit through the input port 78 of the diplexer 76, after which the upstream signals 40 may be transmitted to the CATV network 20. The upstream signals 40 in the second low frequency band may be prevented from passing through the high-pass filter 84 to the first output port 80. The MoCA signals 108 in the high frequency band may be prevented from passing through the low-pass filter 82 to the input port 78. Thus, the signals 108 in the high frequency (i.e., MoCA) band may be prevented from being transmitted to the CATV network 20 where they may be seen as noise. The signals 108 in the high frequency (i.e., MoCA) band may be allowed to pass through the high-pass filter 84 to the second output port 81, where the signals may then pass through the first four-way splitter 86 to the multimedia devices 16 or modems 56 connected thereto.

In the event that the second low frequency band (e.g., of the CATV signals) changes or the high frequency (i.e., MoCA) band changes, the diplexer 76 may be modified or replaced without having to modify or replace the entire entry adapter 10. More particularly, the second housing 44 and the components therein may remain unaltered when the diplexer 76 is modified or replaced.

A method for modifying a cable television (CATV) entry adapter to accommodate a different CATV signal frequency range is disclosed. The method includes replacing an old first housing of a CATV entry adapter with a new first housing of the CATV entry adapter. The new first housing includes an input port configured to connect to a CATV network. The new first housing also includes a low-pass filter connected to the input port. The new first housing also includes a first output port. The new first housing also includes a high-pass filter connected to the first output port. The low-pass filter, the high-pass filter, or both of the new first housing have a different frequency range than the low-pass filter, the high-pass filter, or both of the old first housing. The new first housing also includes a second output port.

The method also includes connecting the first output port of the new first housing with a first splitter in a second housing of the CATV entry adapter. The method also includes connecting the second output port of the new first housing with a second splitter in the second housing of the CATV entry adapter.

The second housing includes a plurality of network ports connected to the first splitter, the second splitter, or both. The network ports are each configured to connect to one of multiple subscriber devices at a subscriber premises. The CATV entry adapter is configured to conduct downstream and upstream CATV signals between the CATV network and one or more of the subscriber devices and to conduct in-home network signals between the subscriber devices connected in an in-home network. At least one of the network ports is configured to receive the downstream CATV signals and the in-home network signals. Another one of the network ports is configured to receive the in-home network signals but not the downstream CATV signals.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A cable television (CATV) entry adapter, comprising:
   a first housing comprising:
      an input port configured to connect to a CATV network;
      a low-pass filter connected to the input port;
      a first output port;
      a high-pass filter connected to the first output port; and
      a second output port; and
   a second housing comprising:
      a first splitter connected to the first output port; and
      a second splitter connected to the second output port;
      wherein the first splitter and the second splitter are configured to connect to subscriber devices at a subscriber premises,
      wherein the entry adapter is configured to transmit in-home network signals in an in-home network from a first of the subscriber devices that is configured to be connected to the first splitter to a second of the subscriber devices that is configured to be connected to the first splitter;
      wherein the entry adapter is configured to transmit the in-home network signals in the in-home network from the first of the subscriber devices that is configured to be connected to the first splitter to a third of the subscriber devices that is configured to be connected to the second splitter;

wherein the entry adapter is configured to prevent the first of the subscriber devices that is configured to be connected to the first splitter from receiving downstream CATV signals;

wherein the entry adapter is configured to the transmit the in-home network signals in the in-home network from the third of the subscriber devices that is configured to be connected to the second splitter to the first of the subscriber devices that is configured to be connected to the first splitter;

wherein the entry adapter is configured to transmit the in-home network signals in the in-home network from the third of the subscriber devices that is configured to be connected to the second splitter to a fourth of the subscriber devices that is configured to be connected to the second splitter; and wherein the entry adapter is configured to allow the third of the subscriber devices that is configured to be connected to the second splitter to receive the downstream CATV signals.

2. The CATV entry adapter of claim 1, wherein the downstream CATV signals occupy a CATV frequency band that is different from an in-home network frequency band occupied by the in-home network signals, and wherein the in-home network signals comprise multimedia over coax alliance (MoCA) signals.

3. The CATV entry adapter of claim 1, wherein the first subscriber device is a multimedia over coax alliance (MoCA)-only device.

4. The CATV entry adapter of claim 1, wherein the third subscriber device is a multimedia over coax alliance (MoCA) device and a CATV device.

5. The CATV entry adapter of claim 1, wherein the first housing is positioned outside of the second housing.

6. A cable television (CATV) entry adapter, comprising:
an input port configured to connect to a CATV network;
a first output port;
a second output port, wherein the input port, the first output port, and the second output port are part of a first housing;
a first splitter connected to the first output port; and
a second splitter connected to the second output port, wherein the first splitter and the second splitter are positioned within a second housing;
wherein the first splitter and the second splitter are configured to connect to subscriber devices at a subscriber premises,
wherein the entry adapter is configured to transmit signals in an in-home network bandwidth but not signals in a CATV bandwidth to the subscriber devices that are configured to be connected to the first splitter, and
wherein the entry adapter is configured to transmit the signals in the in-home network bandwidth and the signals in the CATV bandwidth to the subscriber devices that are configured to be connected to the second splitter.

7. The CATV entry adapter of claim 6, wherein the entry adapter is configured to transmit the signals in the in-home network bandwidth from a first of the subscriber devices that is connected to the first splitter to a second of the subscriber devices that is connected to the first splitter, and wherein the in-home network bandwidth comprises a multimedia over coax alliance (MoCA) bandwidth.

8. The CATV entry adapter of claim 6, wherein the entry adapter is configured to transmit the signals in the in-home network bandwidth from a first of the subscriber devices that is connected to the first splitter to a second of the subscriber devices that is connected to the second splitter.

9. The CATV entry adapter of claim 6, further comprising a diplexer that prevents a first of the subscriber devices that is connected to the first splitter from receiving the signals in the CATV bandwidth.

10. The CATV entry adapter of claim 6, wherein the entry adapter is configured to transmit the signals in the in-home network bandwidth from a first of the subscriber devices that is connected to the second splitter to a second of the subscriber devices that is connected to the first splitter.

11. The CATV entry adapter of claim 6, wherein the entry adapter is configured to transmit the signals in the in-home network bandwidth from a first of the subscriber devices that is connected to the second splitter to a second of the subscriber devices that is connected to the second splitter.

12. The CATV entry adapter of claim 6, further comprising a diplexer that permits a first of the subscriber devices that is connected to the second splitter to receive the signals in the CATV bandwidth.

13. The CATV entry adapter of claim 6, wherein the entry adapter is configured to transmit the signals in the CATV bandwidth from a first of the subscriber devices that is connected to the second splitter through the second output port to the input port.

14. The CATV entry adapter of claim 6, wherein the first housing comprises a first diplexer with a first frequency range, wherein the first housing is configured to be replaced with a new first housing comprising a second diplexer with a second frequency range that is different than the first frequency range, and wherein the second housing is configured to remain in place when the first housing is replaced with the new first housing.

15. A cable television (CATV) entry adapter, comprising:
a first housing comprising:
an input port configured to connect to a CATV network;
a low-pass filter connected to the input port;
a first output port;
a high-pass filter connected to the first output port; and
a second output port; and
a second housing positioned outside the first housing, the second housing comprising:
a first splitter connected to the first output port; and
a second splitter connected to the second output port;
wherein the first splitter and the second splitter are configured to connect to subscriber devices at a subscriber premises,
wherein the entry adapter is configured to transmit in-home network signals in an in-home network from a first of the subscriber devices that is configured to be connected to the first splitter to a second of the subscriber devices that is configured to be connected to the first splitter;
wherein the entry adapter is configured to transmit the in-home network signals in the in-home network from the first of the subscriber devices that is configured to be connected to the first splitter to a third of the subscriber devices that is configured to be connected to the second splitter;
wherein the entry adapter is configured to prevent the first of the subscriber devices that is configured to be connected to the first splitter from receiving downstream CATV signals.

16. The CATV entry adapter of claim 15, wherein the entry adapter is configured to the transmit the in-home network signals in the in-home network from the third of the subscriber devices that is configured to be connected to the second splitter to the first of the subscriber devices that is configured to be connected to the first splitter.

17. The CATV entry adapter of claim 15, wherein the entry adapter is configured to transmit the in-home network signals in the in-home network from the third of the subscriber devices that is configured to be connected to the second splitter to a fourth of the subscriber devices that is configured to be connected to the second splitter.

18. The CATV entry adapter of claim 15, wherein the entry adapter is configured to allow the third of the subscriber devices that is configured to be connected to the second splitter to receive the downstream CATV signals.

19. The CATV entry adapter of claim 15, wherein the entry adapter is configured to transmit the signals in the CATV bandwidth from the third of the subscriber devices that is connected to the second splitter through the second output port to the input port.

* * * * *